Jan. 19, 1943.  W. C. TEASDALE  2,308,942
LAMINATED PLASTER BOARD
Filed May 5, 1941  2 Sheets-Sheet 1
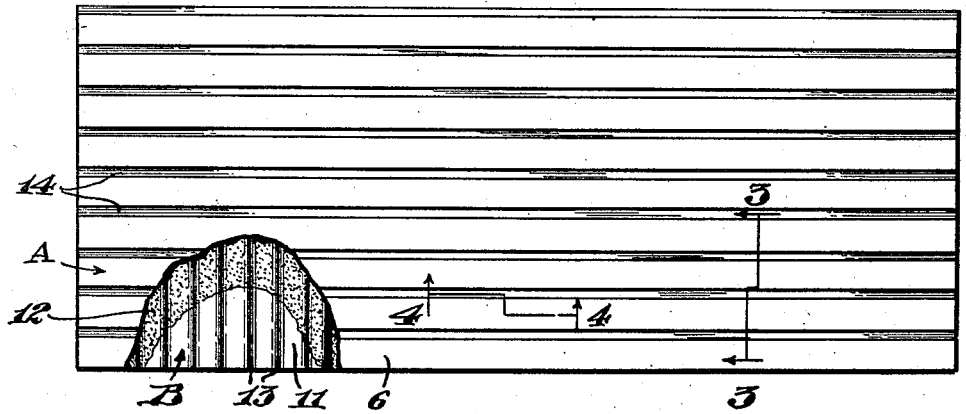
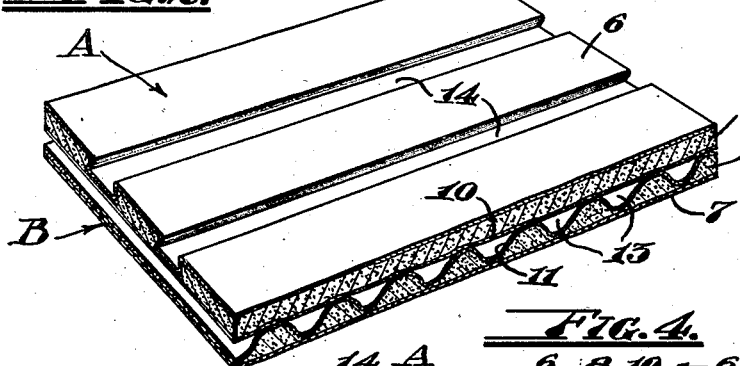
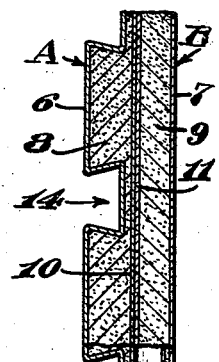
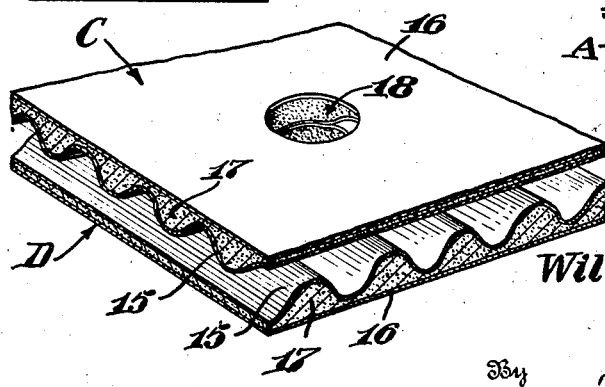
Inventor
William C. Teasdale
By R. S. Berry
Attorney Jan. 19, 1943.  W. C. TEASDALE  2,308,942
LAMINATED PLASTER BOARD
Filed May 5, 1941  2 Sheets-Sheet 2
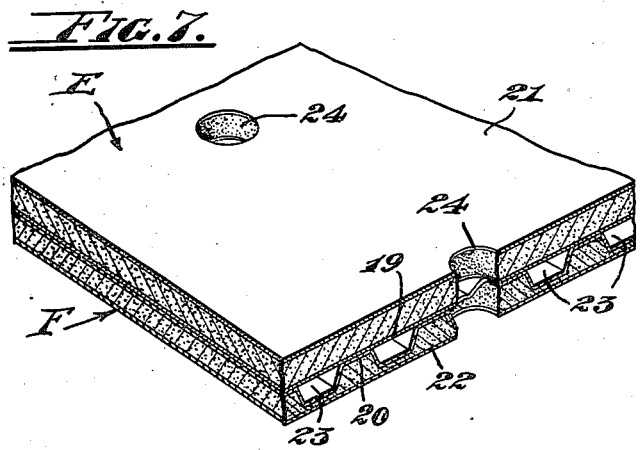
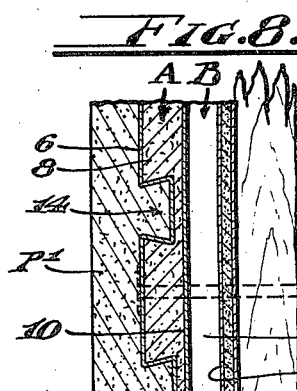
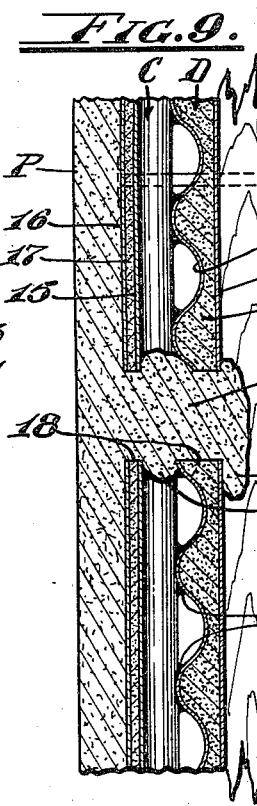
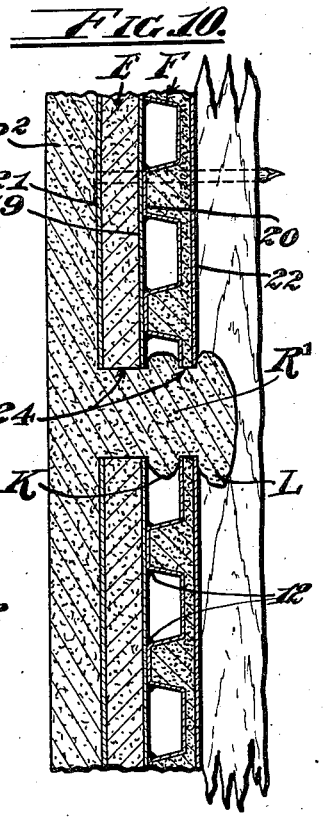
Inventor
William C. Teasdale
By R. S. Berry
Attorney Patented Jan. 19, 1943

2,308,942

UNITED STATES PATENT OFFICE 2,308,942

LAMINATED PLASTERBOARD

William C. Teasdale, Los Angeles, Calif.

Application May 5, 1941, Serial No. 391,863

7 Claims. (Cl. 72—124)

This invention has for its primary object the provision of a plaster board which is constructed and arranged so that the thermal and sound insulating qualities as well as the load, stress, and moisture resisting factors of the board will be appreciably increased while the weight thereof is reduced, compared to ordinary plaster board of similar thicknesses.

Another object of my invention is to provide a laminated plaster board of the character described in which certain of the above noted and other advantages are attributable to the formation in the board of air spaces or chambers which are surrounded by the plaster filler and opposed inner sheets which abut one another and are spaced inwardly from the facing sheets by laminae of plaster, at least one of the inner sheets being corrugated to form the air spaces and also reinforce the unit.

Another object is to provide a laminated plaster board such as hereinbefore noted which may be made up of a plurality of plaster board units permanently adhered together face to face by means of a suitable moisture repelling adhesive coating so that a water proof zone will be formed between the plaster laminations.

A further object is to provide a laminated plaster board of the character described in which one of the facing sheets may be corrugated or otherwise formed to provide plaster bonding and keying formations whereby the unit may be used as a lath board and the bonding or keying formations will reinforce the board.

Another object of my invention is to provide a laminated plaster board such as described in which the innermost sheets separating the plaster laminations and adhered to one another by a moisture repellant adhesive coating will prevent moisture from passing, from one plaster lamination to the other as well as appreciably reinforce the board.

Another object is to provide a plaster board such as described in which the air spaces and the waterproof coating between the partition sheets coact to effectively prevent the seepage of moisture past the partition sheets and from one plaster lamination to the other.

Another object of my invention is to provide a laminated plaster board such as described in which a plurality of plaster receiving key formations will produce a plurality of rivet-like plaster keys extending through and holding the laminations together.

A further object is to provide a board such as described which will be effectively reinforced by having corrugations in at least one partition sheet extend at right angles to corrugations in at least one facing sheet.

With the foregoing objects in view, together with such other objects and advantages as may subsequently appear, the invention is carried into effect as illustrated by way of example in the accompanying drawings, in which:

Fig. 1 is a fragmentary front elevation of an air space plaster board embodying my invention;

Fig. 2 is a perspective view of a board embodying my invention;

Fig. 3 is a sectional view taken on the line 3—3 of Fig. 1;

Fig. 4 is a sectional view taken on the line 4—4 of Fig. 1;

Fig. 5 is a fragmentary perspective view of a modified form of my invention;

Fig. 6 is a sectional view on the line 6—6 of Fig. 4;

Fig. 7 is a fragmentary perspective view of another modified form of my invention;

Fig. 8 is a fragmentary sectional view of the board shown in Figs. 1 to 4 inclusive as when plaster is applied thereto;

Fig. 9 is a fragmentary sectional view of the board shown in Fig. 5 as when plaster is applied thereto;

Fig. 10 is a fragmentary sectional view of the board shown in Fig. 6 as when plaster is applied thereto.

Referring to the drawings more specifically, it is seen that laminated plaster board made in accordance with my invention generally comprises facing sheets 6 and 7 of paper or the like carried by a body or filler consisting of plaster laminations 8 and 9 which also carry and are separated by inner or partition sheets 10 and 11 of paper or the like adhered to one another by means of a waterproof adhesive coating 12 (see Fig. 6) such as asphaltum or the like which is applied to one or both of the partition sheets.

At least one of the inner or partition sheets 10 and 11 is corrugated to define a plurality of closely spaced parallel air spaces or channels 13 extending between opposed edges of the unit. Similarly at least one of the facing sheets 6 and 7 is corrugated to define spaced parallel bonding or keying grooves 14 of dove-tailed cross section and extending between the other edges of the unit and therefore disposed at right angles to the corrugations of the inner sheet whereby the board may be used as a lath board and the right angular disposition of the corrugations will effectively reinforce the unit.

It is now apparent that the plaster board is characterized by plaster and sheet paper laminations between the facing sheets and that the adhesive coating 12 forms a waterproof zone preventing the passage of moisture through the partition sheets and from one plaster lamination to the other. The channel-like air spaces and the inner sheets 10 and 11 and adhesive coating 12 combine to appreciably increase the thermal, sound, and moisture insulating qualities of the board as well as the strength thereof, while the air spaces lighten the unit an appreciable extent.

One method of making the laminated plaster board hereof consists in forming two separate plaster board sections such as the ones here designated A and B, then adhering them together with the adhesive waterproof coating 12. However, any method which will produce the laminated board herewith described and as shown in the accompanying drawings may be used.

As shown in Figs. 5 and 9 I may make a laminated plaster board of two plaster board sections C and D, each of which has a corrugated inner facing sheet 15 and a plain outer facing sheet 16 adhered to a plaster filler 17. These two sections have their corrugated facing sheets coated with a waterproof adhesive (not shown) and are pressed and permanently adhered together with the corrugations at right angles to provide air channels or spaces throughout and also effectively reinforce the board.

Key openings 18 are formed in the board to extend through the sections C and D so that when plaster P is applied to the board it will extend through the openings and form in effect plaster rivets R which serve to hold the sections together as shown in Fig. 9, as well as effectively key the plaster to the board.

Fig. 8 shows the form of board shown in Figs. 1 to 4 inclusive as when plaster $P^1$ is applied thereto.

Figs. 7 and 10 show another form of the invention wherein the board consists of two plaster board sections E and F the partition or inner sheets 19 and 20 of which are adhered together by means of waterproof adhesive coating as in the other forms of my invention. The facing sheets 21 and 22 are plain, whereas the sheet 20 is corrugated to form air channels 23 of rectilinear cross section. Key openings 24 extend through the board so that when the plaster $P^2$ is applied as shown in Fig. 10 plaster keys $R^1$ similar to rivets will be formed to hold the sections together and key the plaster to the board.

It should be noted that the key openings as shown in Figs. 9 and 10 intersect certain of the air spaces so that the plaster will key into said spaces as at K. The key portions K and the innermost key portions L cooperated to effectively bond the plaster to the board and also hold the sections or laminations together.

I claim:

1. In a laminated plaster board, a plaster body formed of plaster laminations, and a partition disposed between and adhered to said laminations including opposed sheets secured together in contact with one another and having air spaces therebetween.

2. In a laminated plaster board, a plaster body formed of plaster laminations, and a waterproof partition disposed between and adhered to said laminations and including opposed sheets adhered to one another and shaped to define air channels extending between certain opposed margins of the board.

3. In a laminated plaster board, facing sheets, a plaster body between said sheets formed of plaster laminations to which said sheets are adhered, a waterproof partition disposed between and adhered to said laminations, and including opposed sheets adhered to one another and shaped to define air channels extending between certain opposed margins of the board and lying in closely spaced parallel relation to one another, one of the facing sheets having bonding grooves extending at right angles to said air channels.

4. In a laminated plaster board, facing sheets, a plaster body between said sheets formed of plaster laminations to which said sheets are adhered, and a partition disposed between and adhered to said laminations, including opposed sheets secured together in contact with one another, one of said partition sheets being corrugated to form air spaces which are surrounded by the plaster of said laminations.

5. In a laminated plaster board, facing sheets, a plaster body between said sheets formed of plaster laminations to which said sheets are adhered, and a partition disposed between and adhered to said laminations, including opposed waterproof sheets secured together in abutting relation and shaped to define between them a plurality of air channels, said board having key openings extending through it and intersecting certain of said air channels whereby plaster applied to the exterior of the board will key into said openings and said certain air spaces.

6. In a laminated plaster board, facing sheets, a plaster body between said sheets formed of plaster laminations to which said sheets are adhered, opposed corrugated partition sheets secured together between said laminations and being adhered to one another and said plaster laminations, the corrugations on one of said partition sheets extending at right angles to the corrugations on the other partition sheet.

7. In a laminated plaster board, facing sheets, a plaster body between said sheets formed of plaster laminations to which said sheets are adhered, opposed corrugated partition sheets secured together between said laminations and being adhered to one another and said plaster laminations, the corrugations on one of said partition sheets extending at right angles to the corrugations on the other partition sheet, said board having key openings extending therethrough so that plaster applied to the exterior of the board will key into said openings and between said opposed partition sheets.

WILLIAM C. TEASDALE.